(12) United States Patent
Gorczyca et al.

(10) Patent No.: US 9,116,072 B2
(45) Date of Patent: Aug. 25, 2015

(54) METHOD AND CONTROL UNIT FOR CHECKING VEHICLE TIRES

(75) Inventors: Sven Gorczyca, Hannover (DE); Rainer Risse, Pattensen-Reden (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/354,017

(22) PCT Filed: Aug. 25, 2012

(86) PCT No.: PCT/EP2012/003593
§ 371 (c)(1),
(2), (4) Date: Apr. 24, 2014

(87) PCT Pub. No.: WO2013/068059
PCT Pub. Date: May 16, 2013

(65) Prior Publication Data
US 2014/0297149 A1 Oct. 2, 2014

(30) Foreign Application Priority Data

Nov. 12, 2011 (DE) .......................... 10 2011 118 436

(51) Int. Cl.
*G06F 19/00* (2011.01)
*G01M 17/02* (2006.01)
*B60C 23/04* (2006.01)
*B60C 23/06* (2006.01)
*G07C 5/08* (2006.01)

(52) U.S. Cl.
CPC ........... *G01M 17/02* (2013.01); *B60C 23/0408* (2013.01); *B60C 23/061* (2013.01); *G07C 5/08* (2013.01)

(58) Field of Classification Search
None
See application file for complete search history.

(56) References Cited

U.S. PATENT DOCUMENTS

| 7,483,794 B2 * | 1/2009 | Bocquillon et al. ............ 702/34 |
| 2006/0156790 A1 * | 7/2006 | Bocquillon et al. ................ 73/8 |
| 2010/0180677 A1 | 7/2010 | Katou |
| 2011/0098882 A1 * | 4/2011 | Sugisawa et al. ............... 701/35 |

FOREIGN PATENT DOCUMENTS

| DE | 103 04 126 A1 | 8/2004 |
| DE | 103 06 498 A1 | 8/2004 |
| EP | 1 475 250 A1 | 11/2004 |
| GB | 2 326 007 A | 12/1998 |

* cited by examiner

*Primary Examiner* — Thomas Tarcza
*Assistant Examiner* — Garrett Evans
(74) *Attorney, Agent, or Firm* — Kramer Levin Naftalis & Frankel LLP

(57) ABSTRACT

In a method for checking vehicle tires, wheel sensor signals of at least one wheel of the vehicle are recorded over a time period, and a comparative value is determined to indicate a travel distance of the wheel. A reference travel distance covered by the vehicle in the time period is determined independently of the wheel sensor signals, and an individual ratio value of the wheel is formed from the wheel travel distance and the reference travel distance. The behavior of the ratio value over time is determined, and a determination is made concerning changes to the tire of the wheel.

11 Claims, 2 Drawing Sheets

METHOD AND CONTROL UNIT FOR CHECKING VEHICLE TIRES

FIELD OF THE INVENTION

The invention generally relates to a method and control device for checking vehicle tires, as well as a vehicle control system equipped with the control device.

BACKGROUND OF THE INVENTION

Various methods are known for monitoring vehicle tires, especially for checking tire inflation pressure (tire air pressure), as well as tire temperature and tire wear (using wear sensors). It is generally difficult to perform checks for vehicles without such sensors.

Tire characteristics can also be monitored in long-term checks. For this purpose, a tire change is noted or monitoring is reset to an initial value. However, when tire changes are not noted, incorrect assessments can occur.

Furthermore, improper tire changes are possible. For example, tires of rented vehicles are sometimes exchanged for and returned with worn tires. It is difficult to detect such abuses.

SUMMARY OF THE INVENTION

Generally speaking, it is an object of the present invention to provide a method and control device for monitoring vehicle tires, which enable checking of the vehicle tires at relatively low cost.

According to an embodiment of the present invention, an individual wheel distance covered during a period of time is determined and compared directly or indirectly with a reference distance covered in the period of time for at least one wheel, preferably for a plurality of wheels or all wheels.

In general, wheel sensors for determining a wheel revolution rate are provided by ABS and/or other control systems, and their signals can be suitably integrated or summed against time. The distances individually covered in a period of time by the individual wheels are then given by, e.g., the radius of the individual wheels and the number of their total revolutions.

A tire change, especially changing a new tire for a worn tire or vice-versa, causes a significant change in tire radius.

By comparing against a reference value over the distance covered by the vehicle in the same period of time, a sufficiently significant change in tire radius can be detected. For this purpose, a comparison variable for indicating a wheel distance of the wheel can be determined from the wheel sensor signals over the period of time, e.g., by integration against time, and the reference distance can be determined over same period of time independently of the wheel sensor Signals, so that an individual ratio value for the wheel, which, e.g., should only change slowly with wear, is formed from the wheel distance and the reference distance.

If a significant change of the ratio value is determined, e.g., following parking of the vehicle or bringing it to rest, a tire change can be detected or at least a warning; signal can be output that indicates a possible tire change.

A global position determining system (GPS) can be used for determining the reference distance. For this purpose, a GPS speed determined by the GPS device of the vehicle can be used directly and integrated against time, or the reference distance can be determined from UPS positions at different points in time by summation integration.

Indeed, the individual v distance can actually deviate somewhat from the reference distance, e.g., while turning or during intermittent slip, so that a pure comparison, e.g., of the GPS speed with the wheel speed does not always provide meaningful values. However, over a sufficiently large distance of, e.g., 10 km, variations caused, e.g., by turning are compensated for, because, on average, an equal number of turns are made to the left and right, and, thus, the individual wheels cover the same vehicle distance on average.

Basically, the formation of a ratio value from a comparison variable formed from the wheel sensor signals and the reference distance is sufficient. Accurate individual wheel distances are not necessarily determined where the circumference used for their determination is initially set from the product 2*PI*Radius.

The reference distance can also be determined from other signals instead of from the GPS. Basically, a relative comparison of the individual wheel distances or the comparison variables characterizing them with each other is also possible; in the event of a change of, e.g., all the tires, this can, however, sometimes not be sufficient. Thus, such a relative comparison is especially useful as an additional measure, i.e., in addition to determining the reference distance.

It should be appreciated that the present invention thus enables checking for a tire change and/or a significant change in the wheel radius, e.g., in the event of a leak in the tire, at relatively low cost, especially, without additional hardware such as additional sensors or markers on the wheels.

For carrying out the inventive method, a control device already present in the vehicle control system can be used. The control device only has to determine the reference distance, e.g., by recording GPS signals and/or revolution rates of the drive train of the vehicle, or, in the case of a trailer, also signals of the towing vehicle.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments and with reference to the accompanying figures, in which.

DETAILED DESCRIPTION OF THE PREFERRED EMBODIMENTS

Figure 1:
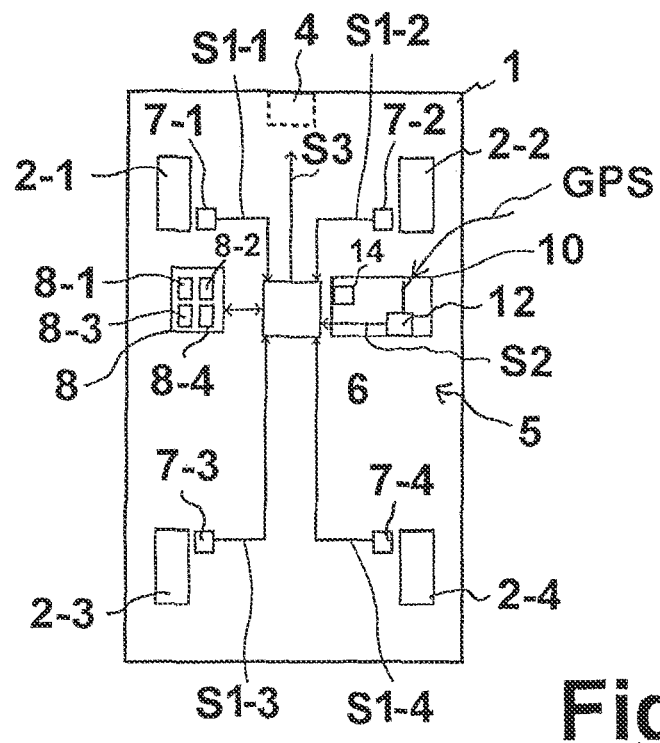
FIG. 1 is a plan view of a vehicle according to an embodiment of the present invention.
Figure 2:
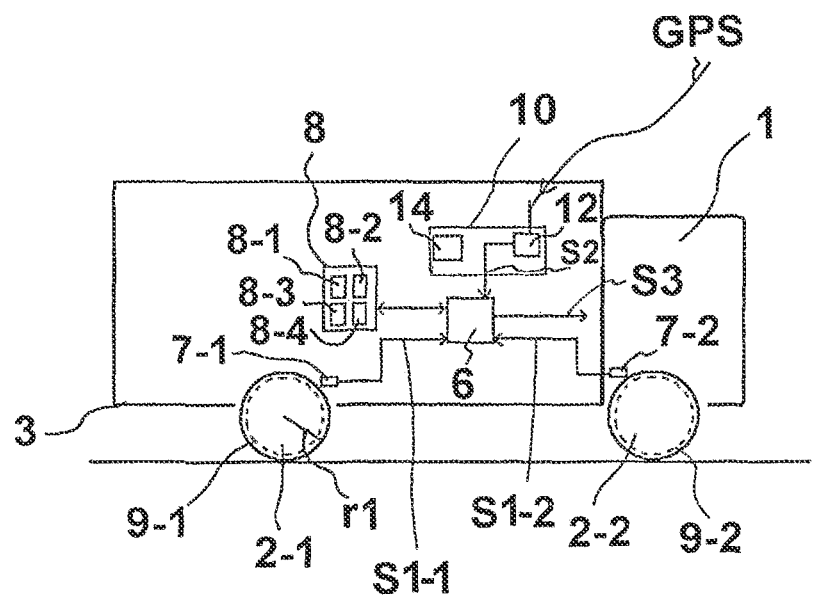
FIG. 2 is a side view of a vehicle according to an embodiment of the present invention.

A vehicle 1 can, e.g., be a trailer or a self-propelled vehicle; it comprises four wheels 2-1, 2-2, 2-3 and 2-4 and a vehicle frame (chassis) 3. In FIG. 1, the vehicle is illustrated as a trailer with a trailer interface 4, which is also used as a data interface to a towing vehicle; by contrast, it is shown as a towing vehicle in FIG. 2.

The vehicle 1 also comprises a brake control system 5, which, among other things, comprises a control device 6, wheel revolution rate sensors 7-1, 7-2, 7-3, 7-4 for measuring the wheel revolution rates of the wheels 2-1, 2-2, 2-3, 2-4, a memory device 8, and, possibly, other components. The brake control system 5 can, e.g., also be a driving dynamics control system; it can be, e.g., an ABS, EBS (electronic brake system), DDC (driving dynamics control), ASR control system or a combination of such control systems. The wheel sensors 7-1 to 7-4 (ABS sensors, wheel revolution rate-sensors) are especially relevant for the invention.

The trailer 1 also comprises a navigation system 10 with a UPS receiver 12 for receiving GPS signals of a global position determination system, which can be supported by satellite or even terrestrially or by a combination thereof, and may comprise a map memory 14. The navigation system 10 can be integrated within the control device 6.

The control device 6, or, possibly, another control device connected to the control device 6, performs a method for checking the wheels 2-1 to 2-4 in addition to the brake control and/or driving dynamics control interventions. For this purpose, the control device 6 receives wheel sensor signals S1-1, S1-2, S1-3 and S1-4 from the wheel sensors 7-1 to 7-4, which are provided on the vehicle frame (chassis) 3 and which detect the wheel revolutions relative to a pole wheel provided on the respective wheel. The wheel sensor signals S1-1, S1-2, S1-3 and S1-4 can contain data about the wheel revolutions or as a time derivative about the wheel revolution rates n1, n2, n3, n4.

From the wheel sensor signals S1-1, S1-2, S1-3 and S1-4, the control device 6 calculates respectively covered wheel distances x1, x2, x3, x4 of the individual wheels 2-1 to 2-4 from a starting point in time to, or at least comparison variables y1, y2, y3, y4 for wheel distances x1, x2, x3, x4. Basically, an accurate calculation of the distances x1, x2, x3, x4 is not necessary because ratio values are formed later anyway.

The control device 6 stores the wheel distances x1, x2, x3, x4 or comparison variables y1, y2, y3, y4 in the memory device 8, e.g., as indicated in separate registers (memory sub units) 8-1 to 8-4.

The individual wheel distances x1 to x4 covered or comparison variables y1, y2, y3, y4 can be determined directly by integration against time of transmitted pulse signals or integration against time of the wheel revolution rates n1 to n4.

The individual wheel distances x1, x2, x3, x4 can each be represented as the product of the tire circumferences and the total wheel revolutions or the integration against time of the wheel revolution rate, i.e.:

$$xi = 2\pi \cdot ri \cdot \int ni \cdot dt$$

where ri is the tire radius of the tire 9-$i$ of the wheel 2-$i$, ni is the respective revolution rate (dimension 1/sec) and xi is the wheel distances, for i=1 to 4.

The comparison variable yi can be formed as $\int ni \cdot dt$ and thus represents the number of wheel revolutions.

The integration against time starts from an initial value t0, which acts as a reference value, e.g., at the start of the journey or when switching on the vehicle 1 or the control device 6, up to a point in time t1, wherein, e.g., a minimum distance of, e.g., 10 km can be specified.

Furthermore, the control device 6 determines a reference distance RS of the vehicle 1 in the period of time from t0 to t1, which it uses for comparison with the individual wheels 2-1 to 2-4.

The reference distance RS can be determined according to one embodiment by means of signals S2 of the navigation system 10, i.e., with the GPS receiver 12.

The control device 6 can receive speed signals directly from the navigation system 10 and can integrate them against time. Furthermore, the control device 6 can also receive individual positions P(t) of the vehicle 1 and determine the reference distance RS sum of the distances of the time sequence of positions P(t). The reference distance RS is thus determined from the starting point in time t0 to the point in time t1.

For a comparison of the wheel distances x1 to x4 with the reference distance RS, individual radii r1 to r4 are unknown. The individual radii can differ depending on the manufacturer and can also be dependent on wear.

A ratio value Vi of yi to RS, e.g., Vi=yi/RS, thus depends on ri. For a constant ri, Vi should not change on average over sufficiently large distances or should gradually increase with wear, because with a reducing ri the wheel revolution rate, and thus the number of wheel revolutions (which is proportional to yi), increases. By making determinations after a large distance, differences between the wheels, especially, between the left and right sides through turns, are completely or substantially compensated for. In a turn, the wheel on the inside of the turn covers a shorter distance than the wheel on the outside of the turn. The stored ratio values Vi should thus be constant or vary in the long term according to the tire wear (reduction of the radius).

The control device 6 can thus store the ratio values Vi directly in the memories 8-1 to 8-4 in each case; they can be continuously updated after reaching the minimum distance.

If the vehicle 1 is switched off at a point in time then the control device 6 stores the current ratio values Vi in the memories 8$i$ at this point in time.

At a subsequent point in time t2, if the engine or the ignition of the vehicle is switched on again or the vehicle drives off again (which is detected from the wheel sensor signals S1-$i$), the control device 6 again determines corresponding ratio values Vi. It compares the new ratio values Vi with the stored ratio values Vi, which were determined before switching off the engine or on terminating the last journey. The change is compared with a threshold SW such as +/−5% or +/−10%, especially for a reduction of the radius ri.

If the ratio Vi=yi/RS is significantly greater than the previously stored ratio value Zi, i.e., the radius ri has become significantly smaller, a display signal S4 is output, especially as a warning signal that, e.g., can also be output via the trailer interface 4 to the towing vehicle.

In addition, any tire pressure sensors provided can be used to take into account changes of the air pressure of the tire, which may lead to a change of the radius. Thus, it can be detected if, the air pressure has been replenished, which, in turn, causes an increase in the radius; furthermore, the air pressure can also change depending on the tire temperature, which is also detected.

Figure 3:
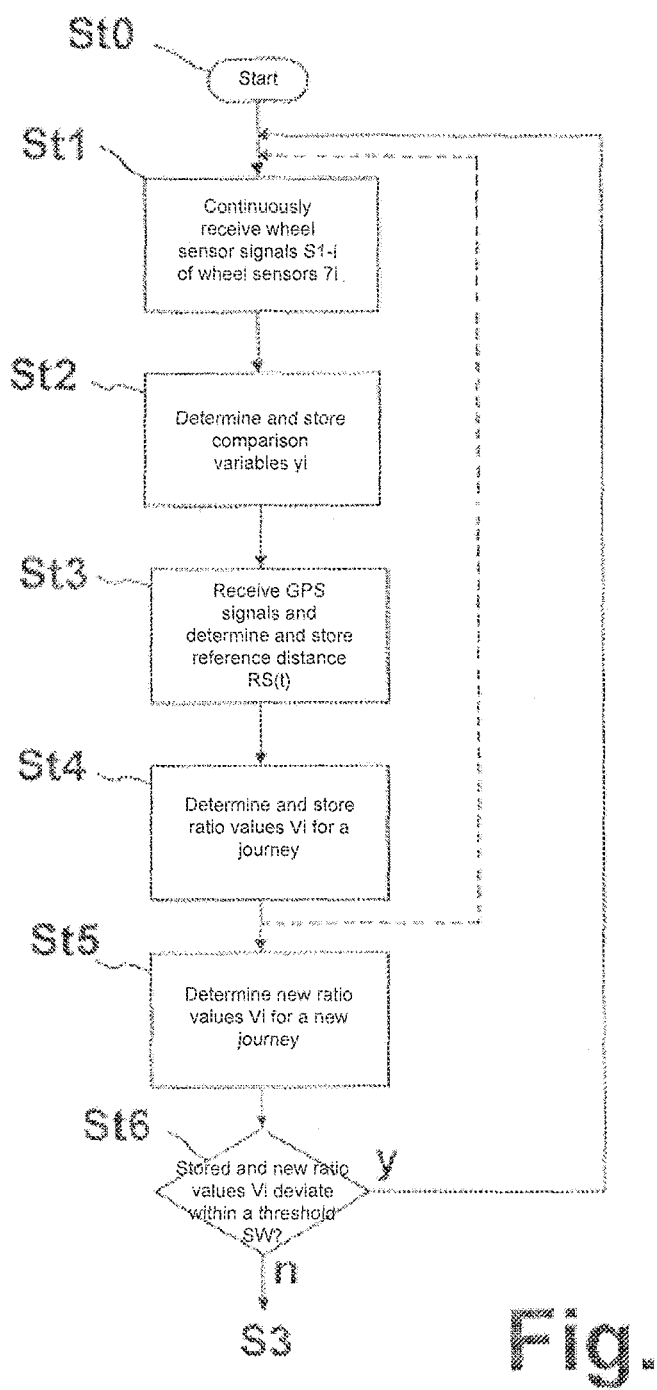
FIG. 3 is a flow diagram illustrating a method according to an embodiment of the present invention.

According to the embodiment of the inventive method illustrated in FIG. 3, the process is started in step St0, e.g., on detecting travel or on starting the engine and the control device 6, or even on receiving signals from the towing vehicle via the trailer interface 4. Subsequently, according to step St1, the wheel sensor signals S1-$i$ of the wheel sensors 7$i$ are continuously received, and, in step St2, the comparison variables yi are formed therefrom and stored.

According to step St3, UPS signals are received and the reference distance RS(t) is determined therefrom and temporarily stored. Steps St2 and St3 thus run in parallel.

In step St4, after a sufficient distance of, e.g., 10 km, ratio values Vi are formed and stored and preferably continuously updated, so that they are stored on terminating the journey, i.e., on switching off the control device 6 or stopping the vehicle 1. Steps St1 to St4 thus run continuously.

In step St5, for a new journey, ratio values Vi are again formed and are compared in step St6 with the previously stored ratio values Vi to determine whether there are deviations within the threshold SW. According to branch n a warning signal S3 is potentially output, or, according to branch y, the process is reset to before step St1.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for checking vehicle tires, comprising: receiving, at a control device of a vehicle, wheel sensor signals of at least one wheel of the vehicle over a period of time, each of the at least one wheel being associated with a respective tire of at least one tire of the vehicle; measuring air pressure of the at least one tire using at least one tire pressure sensor; and using the control device to: determine, based on the wheel sensor signals, at least one comparison variable, each of the at least one comparison variable indicating a wheel distance of a respective wheel of the at least one wheel; determine a reference distance covered by the vehicle in the period of time using information regarding the vehicle other than the wheel sensor signals; determine at least one ratio value, each of the at least one ratio value being a ratio value of the wheel distance of a respective wheel of the at least one wheel and the reference distance; determine a behavior of the at least one ratio value against time by determining a first ratio value of the at least one ratio value for a first wheel of the at least one wheel using a wheel distance of the first wheel detected while the first wheel is in motion, storing the first ratio value after the first wheel becomes stationary, determining a second ratio value of the at least one ratio value for the first wheel using a wheel distance of the first wheel detected after the first wheel resumes motion, and comparing the first ratio value with the second ratio value; and determine a change of the at least one tire based on the measured air pressure and the behavior against time.

2. The method as claimed in claim 1, wherein the first wheel is associated with a first tire of the at least one tire, and wherein using the control device to determine the change of the at least one tire based on the behavior against time comprises using the control device to determine a reduction of radius of the first tire.

3. The method as claimed in claim 1, further comprising using the control device to determine the behavior of the at least one ratio value by determining whether a change of at least one of the at least one ratio value is above a threshold.

4. The method as claimed in claim 1, further comprising using the control device to determine the behavior of the at least one ratio value by determining whether a change of at least two ratio values of the at least one ratio value is above a threshold.

5. A method for checking vehicle tires, comprising: receiving, at a control device of a vehicle, wheel sensor signals of at least one wheel of the vehicle over a period of time, each of the at least one wheel being associated with a respective tire of at least one tire of the vehicle; measuring air pressure of the at least one tire using at least one tire pressure sensor; and using the control device to: determine, based on the wheel sensor signals, at least one comparison variable each of the at least one comparison variable indicating a wheel distance of a respective wheel of the at least one wheel; determine a reference distance covered by the vehicle in the period of time using information regarding the vehicle other than the wheel sensor signals; determine at least one ratio value, each of the at least one ratio value being a ratio value of the wheel distance of a respective wheel of the at least one wheel and the reference distance; determine a behavior of the at least one ratio value against time by determining a first ratio value using the wheel distance of a first wheel of the at least one wheel associated with a first tire of the at least one tire at least one of (i) before switching off one of the vehicle and a towing vehicle that is towing the vehicle and (ii) when the vehicle is stationary, determining a second ratio value using the wheel distance of a second wheel of the at least one wheel associated with a second tire of the at least one tire at least one of (iii) after switching on one of the vehicle and a towing vehicle that is towing the vehicle and (iv) after further travel by the vehicle, and comparing the first ratio value against the second ratio value; and determine a change of the at least one tire based on the measured air pressure and the behavior against time.

6. The method as claimed in claim 1, wherein using the control device to determine the change of the at least one tire comprises using the control device to factor in at least one tire radius change resulting from air pressure change of at least one of the at least one tire.

7. The method as claimed in claim 1, wherein the at least one wheel comprises a plurality of wheels.

8. The method as claimed in claim 7, wherein the at least one comparison variable comprises a plurality of comparison variables, and wherein the at least one ratio value comprises a plurality of ratio values, the method further comprising using the control device to at least one of (i) compare the plurality of ratio values against one another and (ii) compare the plurality of comparison variables against one another.

9. The method as claimed in claim 1, wherein the information is associated with at least one of (i) a global position determination system, (ii) a revolution rate in the vehicle determined from at least one of a wheel shaft and a drive train, and (iii) a vehicle speed transmitted from a towing vehicle.

10. A control system for a vehicle, comprising a control device configured to receive wheel sensor signals of at least one wheel of the vehicle over a period of time, each of the at least one wheel being associated with a respective tire of at least one tire of the vehicle; determine, based on the wheel sensor signals, at least one comparison variable, each of the at least one comparison variable indicating a wheel distance of a respective wheel of the at least one wheel; determine a reference distance covered by the vehicle in the period of time using information regarding the vehicle other than the wheel sensor signals; determine at least one ratio value, each of the at least one ratio value being a ratio value of the wheel distance of a respective wheel of the at least one wheel and the reference distance; determine a behavior of the at least one ratio value against time by determining a first ratio value of the at least one ratio value for a first wheel of the at least one wheel using a wheel distance of the first wheel detected while the first wheel is in motion, storing the first ratio value after the first wheel becomes stationary, determining a second ratio value of the at least one ratio value for the first wheel using a wheel distance of the first wheel detected after the first wheel resumes motion, and comparing the first ratio value with the second ratio value; and determine a change of the at least one tire based on measured air pressure of the at least one tire and the behavior against time.

11. The control system as claimed in claim 10, wherein the control device is associated with at least one of a brake control system and a driving dynamics system.

* * * * *